(12) United States Patent
Fischer

(10) Patent No.: US 9,855,910 B2
(45) Date of Patent: Jan. 2, 2018

(54) SECURING DEVICE FOR A FOLDED AIRBAG AND AIRBAG MODULE

(71) Applicant: TRW Automotive GmbH, Alfdorf (DE)

(72) Inventor: Anton Fischer, Schechingen-Leinweiler (DE)

(73) Assignee: TRW Automotive GmbH (DE)

( * ) Notice: Subject to any disclaimer, the term of this patent is extended or adjusted under 35 U.S.C. 154(b) by 1 day.

(21) Appl. No.: 14/889,889

(22) PCT Filed: May 16, 2014

(86) PCT No.: PCT/EP2014/001315
§ 371 (c)(1),
(2) Date: Nov. 9, 2015

(87) PCT Pub. No.: WO2014/187542
PCT Pub. Date: Nov. 27, 2014

(65) Prior Publication Data
US 2016/0339864 A1 Nov. 24, 2016

(30) Foreign Application Priority Data

May 21, 2013 (DE) ........................ 10 2013 008 467

(51) Int. Cl.
*B60R 21/213* (2011.01)
*B60R 21/217* (2011.01)
*B60R 21/232* (2011.01)
*B60R 21/237* (2006.01)
*B60R 21/231* (2011.01)
*B60R 21/201* (2011.01)

(52) U.S. Cl.
CPC .......... *B60R 21/213* (2013.01); *B60R 21/201* (2013.01); *B60R 21/217* (2013.01); *B60R 21/232* (2013.01); *B60R 21/237* (2013.01); *B60R 21/23138* (2013.01)

(58) Field of Classification Search
CPC ................ B60R 21/201; B60R 21/213; B60R 21/23138; B60R 21/237; B60R 21/217
See application file for complete search history.

(56) References Cited

U.S. PATENT DOCUMENTS 9,321,417 B1 * 4/2016 Lepper .................. B60R 21/213
2006/0255568 A1 11/2006 Demel et al.
2008/0217896 A1 9/2008 Visker
(Continued)

FOREIGN PATENT DOCUMENTS

DE 102007039073 3/2008
EP 0983915 3/2000
(Continued)

*Primary Examiner* — Barry Gooden, Jr.
(74) *Attorney, Agent, or Firm* — Tarolli, Sundheim, Covell & Tummino LLP

(57) ABSTRACT

A mounting device (10) for a folded airbag, especially for a folded side airbag, is provided comprising a base plate (12), a clamping portion (14) encompassing the airbag in ring shape and a fixing plate (16) adjacent to the clamping portion (14). The fixing plate (16) and the base plate (12) exhibit a first and, resp., a second contact surface (32, 34) which are directly superimposed in the mounted condition. Furthermore an airbag module comprising a mounting device (10) is suggested.

14 Claims, 4 Drawing Sheets

(56) References Cited

U.S. PATENT DOCUMENTS

| | | | |
|---|---|---|---|
| 2012/0085874 A1* | 4/2012 | Binkert | F16B 19/1081 248/221.11 |
| 2012/0119048 A1 | 5/2012 | Kim et al. | |
| 2012/0313355 A1* | 12/2012 | Grabowski | B60R 21/20 280/728.2 |
| 2013/0234421 A1* | 9/2013 | Honda | B60R 21/23138 280/729 |
| 2014/0054879 A1* | 2/2014 | Taguchi | B60R 21/213 280/730.2 |
| 2015/0367801 A1* | 12/2015 | Fukuda | B65B 53/02 280/728.2 |
| 2016/0075300 A1* | 3/2016 | Tietze | B60R 21/213 280/728.2 |
| 2016/0159308 A1* | 6/2016 | Choi | B60R 21/201 280/728.2 |

FOREIGN PATENT DOCUMENTS

| | | |
|---|---|---|
| WO | 2008028846 | 3/2008 |
| WO | 102006041704 | 3/2009 |

\* cited by examiner

SECURING DEVICE FOR A FOLDED AIRBAG AND AIRBAG MODULE

RELATED APPLICATIONS

This application corresponds to PCT/EP2014/001315, filed May 16, 2014, which claims the benefit of German Application No. 10 2013 008 467.9, filed May 21, 2013, the subject matter of which are incorporated herein by reference in their entirety.

BACKGROUND OF THE INVENTION

The invention relates to a mounting device for a folded airbag, especially for a folded side airbag, comprising a base plate, a clamping portion encompassing the airbag in ring shape and a fixing plate adjacent to the clamping portion. Furthermore the invention relates to an airbag module comprising at least one mounting device.

Airbags are typically installed in safety systems in a folded condition so that they have a defined expansion in the case of release and can be stored in a space-saving manner. The airbags folded in this way have to be retained in their folded state. For this purpose, in the state of the art mounting devices are known for clamping the folded airbag in its folded condition so that if retained in its folded condition. The state-of-the-art mounting devices typically include a ring-type airbag receiving portion for receiving the folded airbag, wherein the folded airbag is fixed by clamping by a tongue-like strap between two plates of the mounting device.

A mounting device of this type is known, for example, from EP 0 983 915 B1. There is shown a mounting device comprising a base plate, a fixing plate and an interposed clamping portion. In the clamping portion a joint is provided for dividing the clamping portion into two approximately similar segments, with each of the base plate and the fixing plate being arranged on one of said segments. The two segments further are configured to form an annular airbag receiving portion into which the airbag is inserted in the folded condition. For preliminary fixing an end strap of the airbag is guided out of the airbag receiving portion and is pinched between the fixing plate and the base plate so that the folded airbag can be retained in its position inside the airbag receiving portion and in addition is fixed.

It has turned out to be a drawback of this solution that it is complicated to accommodate the folded airbag and to pre-fix the end strap and that an increased space is required for assembly, respectively.

SUMMARY OF THE INVENTION

Therefore it is the object of the invention to improve and, respectively, to facilitate holding and prefixing of the folded airbag.

In accordance with the invention, the object is achieved by a mounting device for a folded airbag, especially for a folded side airbag, comprising a base plate, a clamping portion encompassing the airbag in ring shape and a fixing plate adjacent to the clamping portion, wherein the fixing plate includes a first contact surface and the base plate includes a second contact surface which are directly superimposed in the mounted state.

It is the principal idea of the invention to receive the folded airbag in a mounting device so that no airbag layer is pinched between the base plate and the fixing plate. In this way the assembly is facilitated as no defined clamping force has to be provided between the two plates. The elongate folded airbag is held in a clamped state by the ring-shaped mounting device and laterally projects from the mounting device. In this way the mounting device encompasses the longitudinally folded airbag over a portion of its length.

Preferably the clamping portion includes a bending portion by which the ring-shaped clamping portion can be opened and closed.

It is another aspect of the invention that at least one integrally formed anti-twist element is provided which in the closed state of the mounting device projects into an airbag receiving portion at least defined by the clamping portion. By means of the anti-twist element it is achieved that the folded airbag cannot twist inside the mounting device when the airbag is installed. The anti-twist element projects into the airbag receiving portion so that it interacts directly with the folded airbag and is retained in a stable position by the airbag.

In particular, the anti-twist element includes a bent free end for holding the element even more lightly on the airbag. The free end may be bent, for example, about an angle of approx. 90°.

In accordance with another aspect of the invention, the clamping portion substantially includes plural lands extending in curved shape at least in portions so as to define at least partially an airbag receiving portion. The individual lands impart more flexibility to the clamping portion.

Furthermore, the clamping portion may be adapted to the contour of the folded airbag by the lands extending in curved shape, when the airbag is roll-folded which imparts a round design or round contour to the airbag.

Especially a cut-out is provided in the base plate or in the end of the clamping portion adjacent thereto through which cut-out a mounting strap of the airbag can be guided. Since the airbag is to be held in a pre-fixing position inside the mounting device although pinching of the mounting strap is missing, the mounting strap can be guided through the cut-out so as to be fixed to a side of the base plate opposite to the second contact surface. The outer mounting strap is then pinched between the base plate and the vehicle during mounting.

Another aspect of the invention provides that at least one mounting hole is provided in the based plate and in the fixing plate for arranging the mounting device on the vehicle side. The mounting holes in both plates are aligned when the mounting device is in a state for being installed so that a fastening means can be put through the two mounting holes so as to arrange the entire mounting device on the vehicle side. In addition, the fastening means keeps the clamping portion closed in ring shape.

At least one projection may be provided on the base plate, especially on the rear side of the base plate and adjacent to the cut-out, for pre-fixing the airbag. The mounting strap guided through the cut-out can be pre-fixed to the base plate by means of the projection. For this purpose, the mounting strap includes at least one corresponding hole through which the projection can be guided. Moreover it is ensured that the mounting strap has the correct length and that the airbag has not been unrolled too far, which might change the unfolding behavior of the airbag.

Another aspect of the invention provides that a coupling device is provided for coupling plural adjacent mounting devices forming a pre-assembled unit. This means that plural mounting devices can be coupled to one another so that e.g. an elongate folded airbag, as in the case of a head-side airbag, can be arranged on the vehicle side by plural mounting devices. The mounting devices are coupled to each other so as to prevent mutual relative twisting and to exactly observe a predetermined distance. The number of mounting devices is variable so that the pre-mounted unit can be designed in modules.

It is especially provided that the mounting device is formed in one piece and preferably is an injection-molded part. The one-piece design helps to reduce the assembling costs of the mounting device as it can be manufactured in one processing step. Moreover, the design as an injection-molded part allows inexpensive manufacture of the mounting device.

Furthermore, the invention provides an airbag module comprising at least one mounting device of the afore-described type and a folded airbag having en external airbag wall and an adjacent mounting strap. The aforementioned advantages regarding the interaction of the mounting device and the folded airbag are applicable analogously to the airbag module.

In particular, the mounting strap contacts the side of the base plate opposite to the second contact side.

It is another aspect of the invention that the base plate or the end of the clamping portion adjacent to the base plate includes a cut-out through which the mounting strap is guided so that it contacts the side of the base plate opposite to the fixing plate.

Especially, the mounting strap includes at least one opening and the base plate includes at least one protruding projection, the projection passing through the opening so that the airbag is pre-fixed. The pre-fixing of the folded airbag inside the mounting device ensures that the mounting strap and, resp., the outer airbag layer cannot continue unrolling from the folded airbag.

An integrally formed anti-twist element of the mounting device may extend between two layers of the folded airbag, especially between the outer layer and the layer underneath. Thus the anti-twist element engages in the folded airbag so as to prevent the folded airbag from twisting relative to the mounting device.

BRIEF DESCRIPTION OF THE DRAWINGS

Further advantages and features of the invention will be resulting from the following drawings which are referred to and in which.

DESCRIPTION

Figure 1:
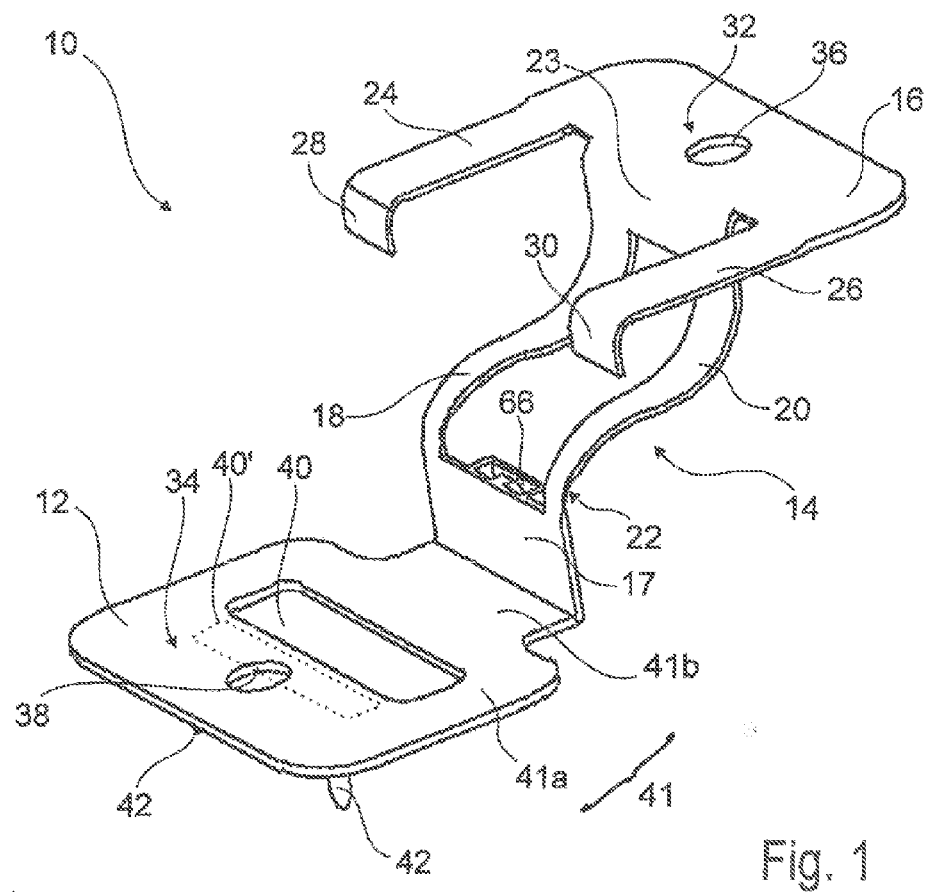
FIG. 1 shows a perspective view of a mounting device according to the invention in the initial condition.

FIG. 1 illustrates a mounting device 10 for an elongate side airbag in the initial condition comprising a base plate 12, an adjacent clamping portion 14 and a fixing plate 16 adjacent to the clamping portion 14, with the clamping portion 14 interconnecting the two plates 12, 16.

In the shown embodiment the clamping portion 14 comprises a plate-like portion 17. From said plate-like portion 17 two parallel lands 18, 20 extend in curved shape. The transition area between the plate-like portion 17 and the two lands 18, 20 constitutes a bending area 22 (integral hinges) of the clamping portion 14, the bending area 22 also comprising the starting points of the two lands 18, 20.

The two lands 18, 20 are transformed into a connecting portion 23 which in turn is transformed into the fixing plate 16.

In the illustrated embodiment, from the fixing plate 16 two anti-twist elements 24, 26 extend in the form of freely protruding lugs in the direction of expansion of the fixing plate 16.

Each of the anti-twist elements 24, 26 has a free end 28, 30 which is bent with respect to the remaining anti-twist element 24, 26.

In the shown embodiment the angle is approx. 90° with the bending being curved. The anti-twist elements 24, 26 fix the mounting device 10 to an airbag not shown here so that the latter cannot twist relative to the mounting device 10.

Figure 2:
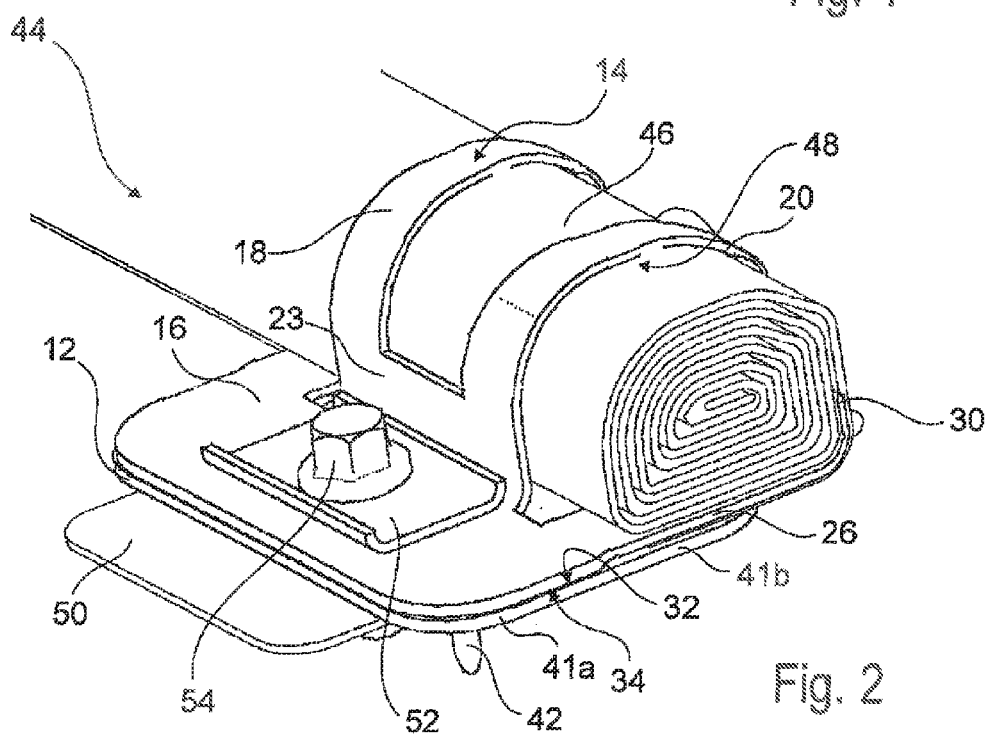
FIG. 2 shows a perspective view of an airbag module according to the invention in the mounted condition.

Moreover, the fixing plate 16 includes a first contact surface 32 which rests directly on a second contact surface 34 at the base plate 12 in the installed condition of the mounting device 10 (see FIG. 2).

For this purpose, the mounting device 10 is bent over the bending area 22 of the clamping portion 14.

In addition, the fixing plate 16 and the base plate 12 include first and second mounting holes 36, 38 which in the installed condition of the mounting device 10 are aligned so that a fastening means (in this case a screw) can be guided through the mounting hole 36, 38 for fastening the mounting device 10 on the vehicle side, for example.

The base plate 12 extends into a planar area 41 of the clamping portion which is located in the same plate plane and is divided into first and second segments 41a and 41b.

The base plate 12 or the end of the clamping portion 14 adjacent to the base plate, in this case the segment 41a, exhibits a cut-out 40. A cut-out 40' located in the base plate 12 is shown by broken lines.

Furthermore, in the shown embodiment two projections 42 are arranged on the side opposite to the second contact surface 34. The function of the projections 42 and of the cut-out 40 shall be explained by way of the FIGS. 2 to 6.

In FIG. 2 an airbag module 44 according to the invention is illustrated which includes a mounting device 10 according to the embodiment shown in FIG. 1 as well as a folded, in this case rolled-folded, airbag 46. The airbag 46 is accommodated inside an airbag receiving portion 48 of the mounting device 10 defined by the ring-shaped clamping portion 14. The fixing plate 16 is not part of the airbag receiving portion 48, as is evident from the Figures, but merely rests, with the first contact surface 32, directly on the second contact surface 34 of the base plate 12.

The longitudinally folded airbag 46 is encompassed and pinched by the clamping portion 14 transversely to the longitudinal extension but is laterally projecting on both sides of the clamping portion 14.

At one end the airbag 46 has a mounting strap 50 which is located outside the airbag receiving portion 48. The mounting strap 50 is guided through the cut-out 40, which is especially evident from FIG. 3, and serves for fixing the airbag 46, as will be explained in detail hereinafter.

It can further be seen from these Figures that the mounting device 10 is fixed in the installed condition by a securing plate 52 and a fastening means 54 in its position retaining the folded airbag 46. The fastening means 54 further serves for fastening the mounting device 10 or the entire airbag module 44 on the vehicle side. The fastening means considered for this purpose especially are bolts, screws or clip connecting means. The securing plate 52 serves for spreading the pressure on the fixing plate 16 and the base plate 12.

The interaction between the mounting device 10 and the airbag 46 and, resp., the airbag module 44 is as follows:

At first the mounting device 10 is provided in the initial condition as shown in FIG. 1, in this condition the bending portion 22 of the clamping portion 14 is not yet curved so that the folded airbag 46 can be inserted in the clamping portion 14. Since the clamping portion 14 is formed, inter alia, of two curved lands 18, 20 forming at least a portion of a holding ring for the folded airbag 46, the folded airbag 46 can be easily inserted while retaining its shape.

The folded airbag 46 is inserted in the airbag receiving portion 48 so that (cf. FIG. 3) the anti-twist elements 24, 26 extend into the airbag 46 between the outer layer 56 thereof and the layer 58 underneath. This means that the anti-twist elements 24, 26 engage in the airbag 46 such that the outer layer 56 is separated in portions from the remaining layers of the airbag 46.

The bent ends 28, 30 extend along the course of winding so that the elements 24, 26 cannot slip out of the airbag 46.

After inserting the folded airbag 46 in the clamping portion 14 as afore described, the mounting device 10 and, resp., the airbag module 44 can be transferred to the installed condition (FIGS. 2 to 6). For this purpose, the clamping portion 14 and the bending portion 22, resp., are bent so that the first contact surface 32 and the second contact surface 34 are facing each other. The bending portion 22 is bent so far that the first contact surface 32 and the second contact surface 34 are directly superimposed. It is generally irrelevant whether the fixing plate 16 is bent toward the base plate 12 or the base plate 12 is bent toward the fixing plate 16.

Before the two contact surfaces 32, 34 adopt their final directly superimposed position, however, the mounting strap 50 constituting a tongue-like projection of the outer layer 56 is guided through the cut-out 40 in the base plate 12. The mounting strap 50 includes openings 60 through which the projections 42 may pass so that the folded airbag 46 is pre-fixed at the mounting device 10.

Said pre-fixing position ensures that the airbag 46 cannot further unroll. Moreover it is thus guaranteed that the airbag 46 is unrolled only corresponding to its pre-defined length. If the airbag 46 was unrolled too much or too little, either the openings 60 would not be aligned with the projections 42 or folds would be formed.

After the airbag 46 is pre-fixed, the clamping portion 14 is bent over the bending portion 22 into its final and, resp., installed position so that the first contact surface 32 rests directly on the second contact surface 34. This last bending merely achieves that the two contact surfaces 32, 34 are directly superimposed.

In order to enable the fastening means 54 to pass through the mounting strap 50 the mounting strap 50 equally includes an opening which is aligned with the two mounting holes 36, 38.

On the rear side of the base plate 12 and the strap 50 a lock plate 62 is attached to the fastening means 54 for keeping the mounting device 10 closed so that a secured pre-assembling state is obtained.

The fastening means 54 helps to fasten the mounting device 10 including the airbag 46 and the airbag module 44 on the vehicle side.

Figure 3:
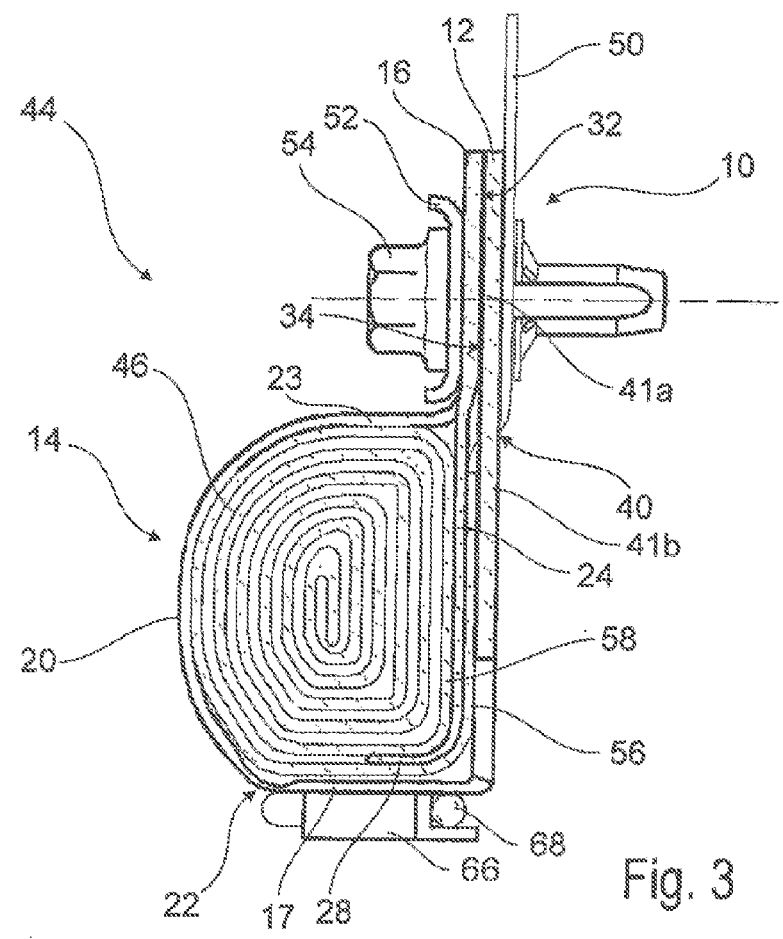
FIG. 3 shows a sectional view across the airbag module from FIG. 2.
Figure 4:
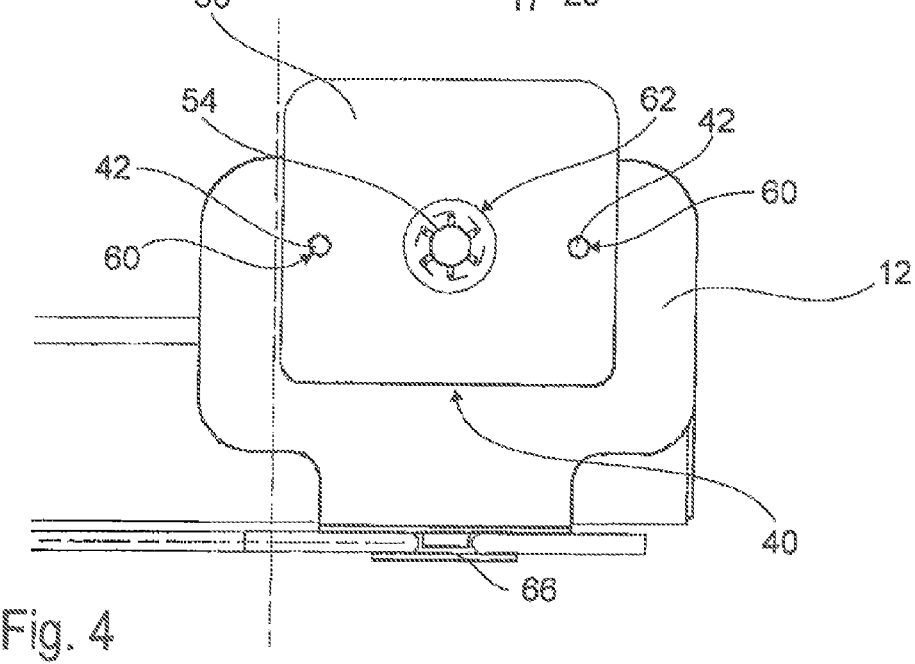
FIG. 4 shows a rear view of the airbag module according to FIG. 2.
Figure 5:
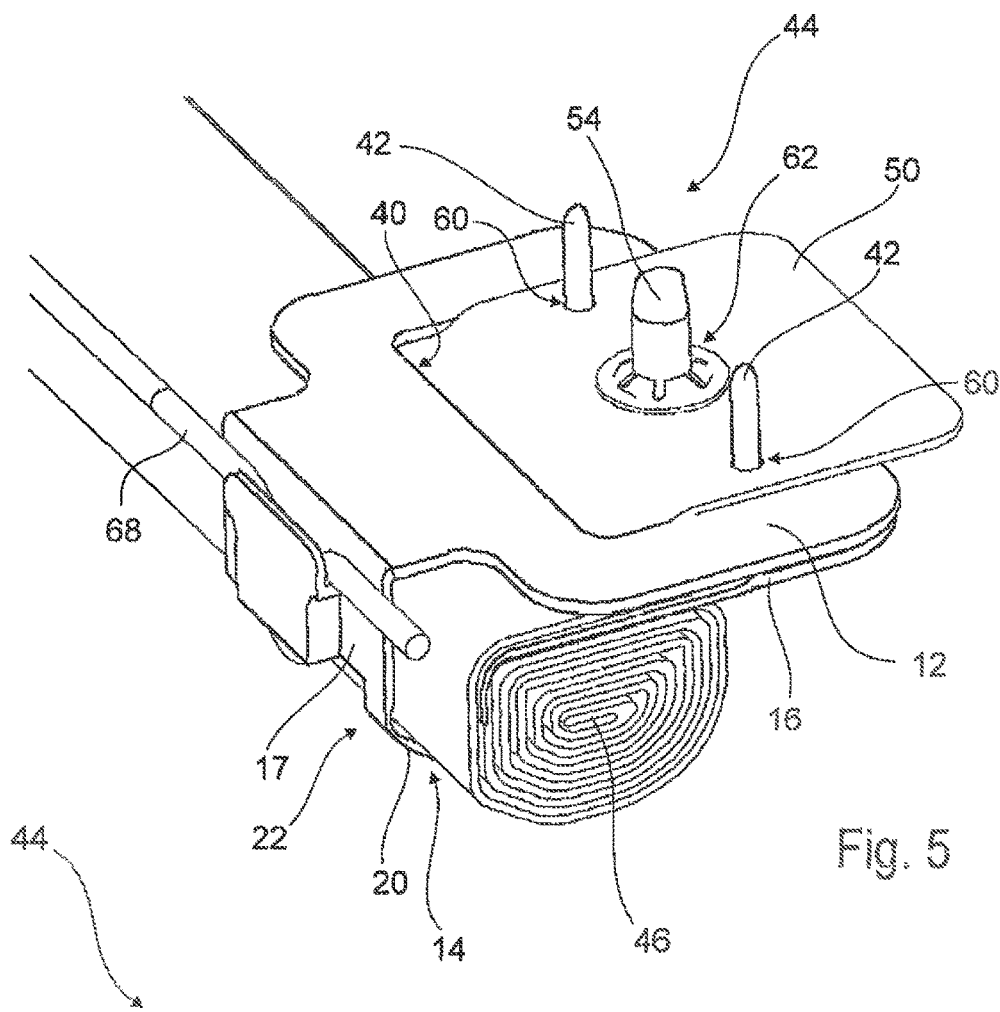
FIG. 5 shows another perspective view of the airbag module.
Figure 6:
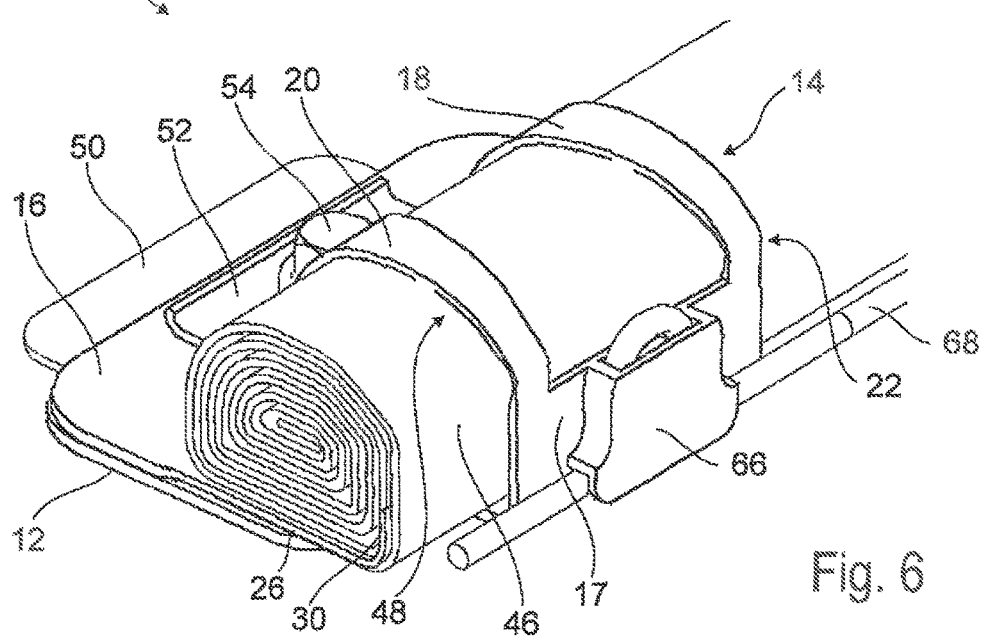
FIG. 6 shows another perspective view of the airbag module.

The anti-twist elements 24, 26 have a thickness which is smaller compared to the fixing plate 16, which enables them to better engage in the layers 56, 58 of the folded airbag 46. The anti-twist elements 24, 26 form a plane with the side of the fixing plate 16 opposite to the first contact surface 32, however. Accordingly, a step is formed between the anti-twist elements 24, 26 and the fixing plate 16 on the side where the first contact surface 32 is provided. The step has a height corresponding to an airbag layer, especially to the outer layer 56. This is illustrated in FIG. 3.

In the area of the cut-out 40 the anti-twist elements 24, 26 are transformed into the fixing plate 16. This ensures that no airbag layer is pinched between the fixing plate 16 and the base plate 12.

Moreover, it is evident from FIGS. 2 to 6 that the mounting device 10 includes a coupling device 66 in the form of a hook integrally formed on the rear side of the section 17. Through the coupling device 66 plural mounting devices 10 can be coupled to each another, which is especially useful in the case of elongate airbag modules 44 including airbags such as head-side airbags.

Figure 7:
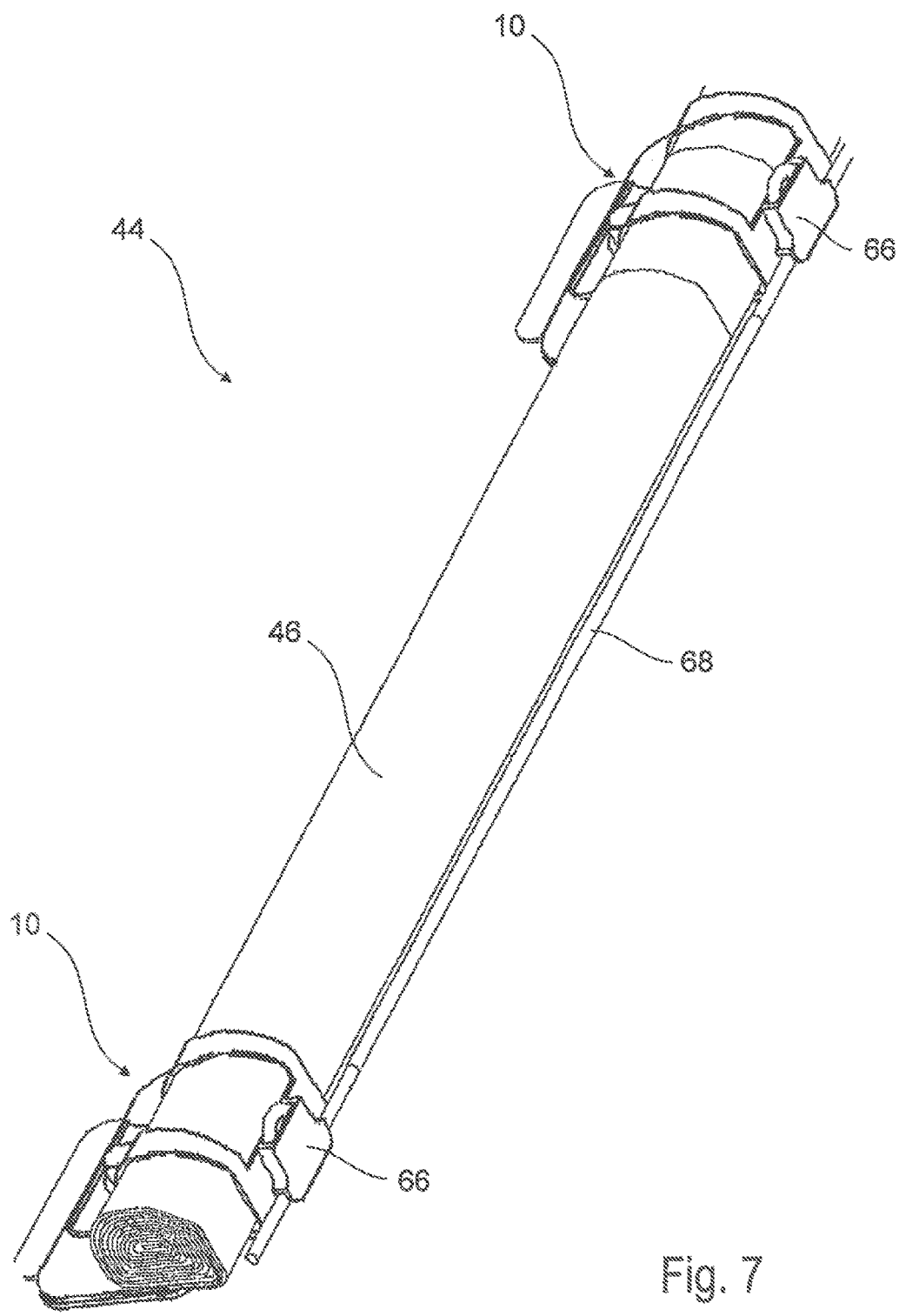
FIG. 7 shows an airbag module according to another embodiment of the invention.

FIG. 7 illustrates an airbag module 44 including two mounting devices 10 which are coupled to each other via the respective coupling devices 66. The two coupling devices 66 are connected by a joint wire 68, wherein the coupling devices 66 may also be in the form of a clip connection. This constitutes a simple and inexpensive connection of the two mounting devices 10.

It may further be provided that more than two mounting devices 10 interact with an airbag 46 so as to form an airbag module 44.

In this way, an airbag module 44 having a modular design can be realized by the mounting device 10 according to the invention.

The mounting device 10 employed may be generally be configured in one piece. For example, the mounting device 10 may be an injection-molded part.

The invention claimed is:

1. An airbag module (44) comprising at least one mounting device (10) and a folded airbag (46) comprising an outer airbag wall (56) and a mounting strap (50) formed on an end of the folded airbag (46),
   wherein each of the mounting devices comprises a base plate (12), a clamping portion (14) encompassing the airbag (46) in a ring shape and a fixing plate (16) adjacent to the clamping portion (14),
   wherein the fixing plate (16) has a first contact surface (32) and the base plate (12) has a second contact surface (34) which are directly superimposed in a mounted state and in that the mounting strap (50) contacts a rear side of the base plate (12) opposite to the second contact surface (34),
   wherein at least one projection (42) is provided on the rear side of the base plate (12) and adjacent to a cut-out (40) for pre-fixing the airbag (46) on the at least one mounting device (10).

2. The airbag module (44) according to claim 1, wherein the clamping portion (14) includes plural lands (18, 20) extending in a curved shape at least in portions so as to at least partially define an airbag receiving portion (48).

3. The airbag module (44) according to claim 1, wherein the cut-out (40) is provided in the base plate (12) or in an adjacent end of the clamping portion (14) through which the mounting strap (50) of the airbag (46) can be guided.

4. The airbag module (44) according to claim 1, wherein each of the base plate (12) and the fixing plate (16) includes at least one mounting hole (38, 36) by which the at least one mounting device (10) is arranged on a vehicle side.

5. The airbag module (44) according to claim 1, wherein a coupling device (66) is provided for coupling a plurality of the at least one mounting devices (10) together to form a pre-assembled unit prior to securing the airbag module to a vehicle.

6. The airbag module (44) according to claim 1, wherein each of the mounting devices (10) is a one piece injection-molded part.

7. The airbag module (44) according to claim 1, wherein the base plate (12) or an end of the clamping portion (14) adjacent to the base plate (12) has the cut-out (40) through which the mounting strap (50) is guided so as to contact the rear side of the base plate (12) opposite to the fixing plate (16).

8. The airbag module (44) according to claim 1, wherein the mounting strap (50) includes at least one opening through which the at least one projection (42) passes through the at least one opening to pre-fix the airbag (46) on the at least one mounting device (10).

9. The airbag module (44) according to claim 1, wherein an integrally formed anti-twist element (24, 26) of each mounting device (10) extends between an outer layer (56) of the folded airbag (46) and a layer (58) underneath the outer layer (56).

10. The airbag module (44) according to claim 1, wherein at least one integrally formed anti-twist element (24, 26) is provided on the at least one mounting device (10) which in the mounted state of the at least one mounting device (10) projects into an airbag receiving portion (48) defined by the clamping portion (14).

11. The airbag module (44) according to claim 10, wherein each of the anti-twist elements (24, 26) includes a bent free end (28, 30).

12. An airbag module comprising at least one mounting device (10) and a folded airbag (46) comprising an outer airbag wall (56) and a mounting strap (50) formed on an end of the folded airbag (46), wherein each of the mounting devices comprises a base plate (12), a clamping portion (14) encompassing the airbag (46) in a ring shape and a fixing plate (16) adjacent to the clamping portion (14), wherein the fixing plate (16) has a first contact surface (32) and the base plate (12) has a second contact surface (34) which are directly superimposed in a mounted state and in that the mounting strap (50) contacts a rear side of the base plate (12) opposite to the second contact side (34), wherein the at least one mounting device includes a pair of anti-twist elements positioned on opposite sides of the clamping portion for extending between layers of the folded airbag.

13. An airbag module comprising:

a folded airbag including a mounting strap at one end; and at least one mounting device having a base plate, a fixing plate, and a clamping portion connecting the base plate to the fixing plate, the base plate having a first contact surface and the fixing plate having a second contact surface, a pair of anti-twist elements extending from the fixing plate and positioned on opposite sides of the clamping portion, wherein the at least one mounting device has a mounted state in which the clamping portion cooperates with the base plate and the fixing plate to encircle the folded airbag and in which the first contact surface and the second contact surface engage one another and in which the anti-twist elements extend between layers of the folded airbag, the mounting strap extending through a cut-out in the at least one mounting device and engaging a rear side of the base plate opposite the second contact surface when the at least one mounting device is in the mounted state.

14. The airbag module of claim 13, wherein each of the base plate and the fixing plate includes a mounting hole which are aligned with one another and an opening in the mounting strap when the mounting device is in the mounted state, wherein a fastener extends through the mounting holes and the opening in the mounting strap to prevent unrolling of the airbag.

\* \* \* \* \*